(12) United States Patent
Panusopone et al.

(10) Patent No.: US 8,798,152 B2
(45) Date of Patent: Aug. 5, 2014

(54) METHOD AND APPARATUS FOR FAST MOTION ESTIMATION

(75) Inventors: Krit Panusopone, San Diego, CA (US); David M. Baylon, San Diego, CA (US); Weiyao Lin, Seattle, WA (US)

(73) Assignee: General Instrument Corporation, Horsham, PA (US)

( * ) Notice: Subject to any disclaimer, the term of this patent is extended or adjusted under 35 U.S.C. 154(b) by 1453 days.

(21) Appl. No.: 12/209,173

(22) Filed: Sep. 11, 2008

(65) Prior Publication Data

US 2010/0061458 A1 Mar. 11, 2010

(51) Int. Cl.
*H04N 7/32* (2006.01)
(52) U.S. Cl.
USPC ................................. 375/240.16; 382/107
(58) Field of Classification Search
USPC ........................................ 375/240.16, 240.17
See application file for complete search history.

(56) References Cited

U.S. PATENT DOCUMENTS

| | | | | |
|---|---|---|---|---|
| 5,481,553 A | * | 1/1996 | Suzuki et al. | 714/800 |
| 2001/0002205 A1 | * | 5/2001 | Beattie | 375/240.12 |
| 2003/0161400 A1 | * | 8/2003 | Dinerstein et al. | 375/240.16 |
| 2004/0156435 A1 | * | 8/2004 | Itoh et al. | 375/240.16 |
| 2006/0153298 A1 | * | 7/2006 | Valente | 375/240.16 |
| 2007/0237232 A1 | * | 10/2007 | Chang et al. | 375/240.16 |
| 2007/0274396 A1 | * | 11/2007 | Zhang et al. | 375/240.24 |
| 2008/0019448 A1 | * | 1/2008 | Lee et al. | 375/240.16 |
| 2008/0089419 A1 | * | 4/2008 | Kervec et al. | 375/240.17 |
| 2008/0123904 A1 | * | 5/2008 | Sakamoto et al. | 382/107 |
| 2008/0192821 A1 | * | 8/2008 | Malayath et al. | 375/240.03 |
| 2009/0225845 A1 | * | 9/2009 | Veremeev et al. | 375/240.16 |

OTHER PUBLICATIONS

Ismail, "Fast Motion Estimation System Using Dynamic Models for H.264/AVC Video Coding", 2012, IEEE, vol. 22, p. 28-42.*

* cited by examiner

*Primary Examiner* — Mahfuzur Rahman
*Assistant Examiner* — Gregory Lane
(74) *Attorney, Agent, or Firm* — Thomas A. Ward

(57) ABSTRACT

Embodiments of the invention generally provide a method and apparatus for fast motion estimation. One embodiment of a method for motion estimation includes classifying a macroblock of a source frame in accordance with an initial matching cost, an intermediate matching cost, and a final matching cost, where the intermediate matching cost is estimated based on a predicted motion vector for the source frame and the final matching cost is estimated based on a final motion vector for a correlated macroblock in a prior frame, performing motion estimation for the macroblock based upon the classifying, wherein an early termination is applied in accordance with a result of the classifying, and outputting a motion vector for the macroblock based on a result of the motion estimation.

24 Claims, 3 Drawing Sheets

METHOD AND APPARATUS FOR FAST MOTION ESTIMATION

FIELD OF THE INVENTION

The present invention generally relates to video encoding, and more particularly relates to motion estimation.

BACKGROUND OF THE INVENTION

Numerous fast motion estimation techniques have been proposed to speed up video encoder processes. A majority of these techniques skip most search candidates that are considered unlikely to be the best match in order to reduce the overall complexity of the motion estimation technique. Other techniques, such as early termination techniques, stop motion estimation early if certain conditions are met after searching a few candidates.

Therefore, there is a need in the art for a method and apparatus for fast motion estimation that efficiently speeds up the video encoding process.

SUMMARY OF THE INVENTION

Embodiments of the invention generally provide a method and apparatus for fast motion estimation. One embodiment of a method for motion estimation includes classifying a macroblock of a source frame in accordance with an initial matching cost, an intermediate matching cost, and a final matching cost, where the intermediate matching cost is estimated based on a predicted motion vector for the source frame and the final matching cost is estimated based on a final motion vector for a correlated macroblock in a prior frame, performing motion estimation for the macroblock based upon the classifying, wherein an early termination is applied in accordance with a result of the classifying, and outputting a motion vector for the macroblock based on a result of the motion estimation.

In another embodiment, a computer readable medium contains an executable program for motion estimation, where the program classifies a macroblock of a source frame in accordance with an initial matching cost, an intermediate matching cost, and a final matching cost, where the intermediate matching cost is estimated based on a predicted motion vector for the source frame and the final matching cost is estimated based on a final motion vector for a correlated macroblock in a prior frame, performs motion estimation for the macroblock based upon the classifying, wherein an early termination is applied in accordance with a result of the classifying, and outputs a motion vector for the macroblock based on a result of the motion estimation.

In another embodiment, a video encoder includes an input for receiving a source frame and a motion estimator for classifying a macroblock of the source frame in accordance with an initial matching cost, an intermediate matching cost, and a final matching cost, where the intermediate matching cost is estimated based on a predicted motion vector for the source frame and the final matching cost is estimated based on a final motion vector for a correlated macroblock in a prior frame, where the motion estimator further performs motion estimation for the macroblock based upon the classifying and applies an early termination in accordance with a result of the classifying, and where the motion estimator outputs a motion vector for the macroblock based on a result of the motion estimation.

BRIEF DESCRIPTION OF THE DRAWINGS

So that the manner in which the above recited embodiments of the invention are attained and can be understood in detail, a more particular description of the invention may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for fast motion estimation. In one embodiment, a motion estimation technique employs early termination based on classification to achieve faster video encoding speeds. Embodiments of the present invention can be employed in combination with a simplified hexagon search in order to achieve even faster speeds. However, the invention is not limited to combination with simplified hexagon search, and may in fact be easily extended to other motion estimation techniques as well.

Figure 1:
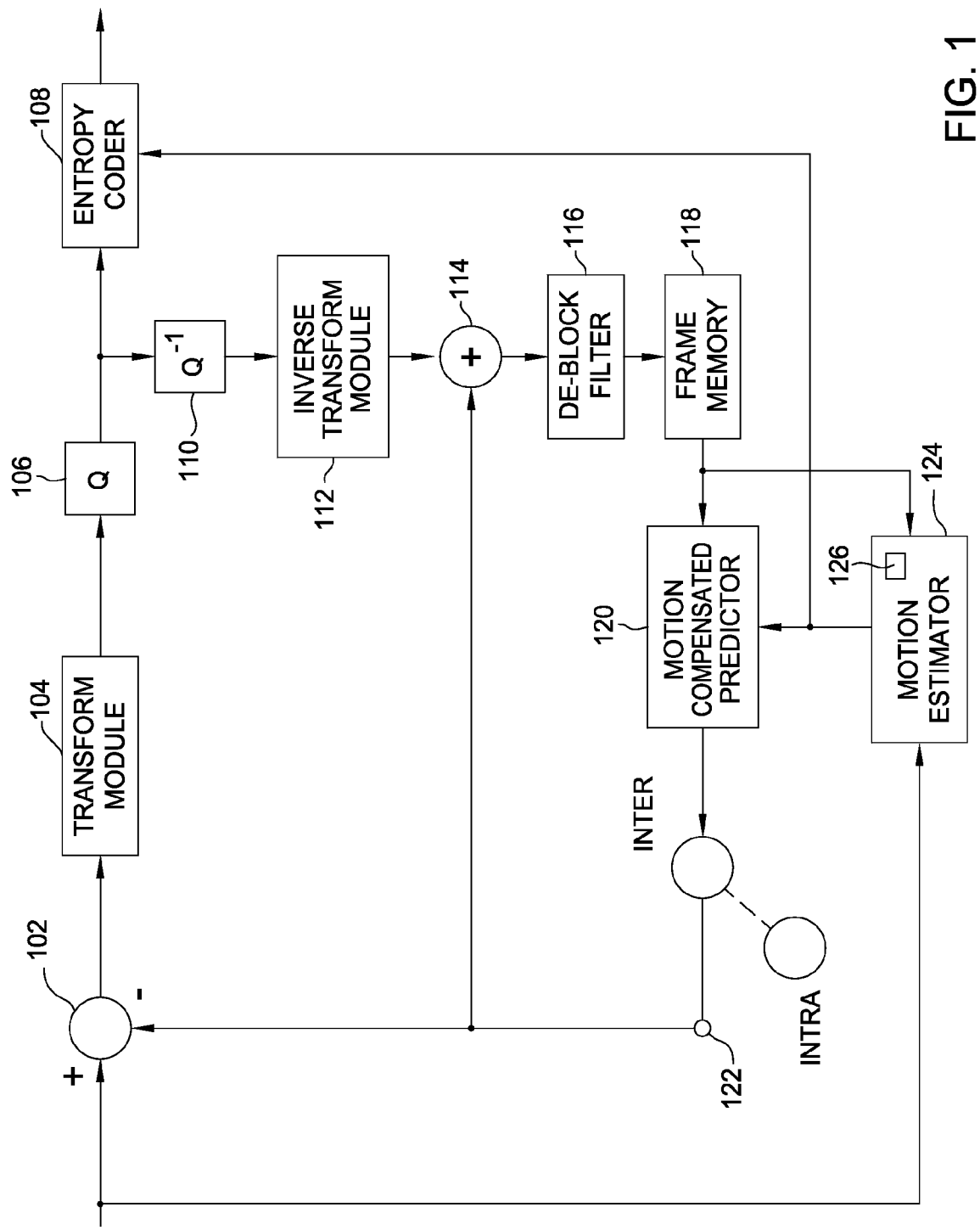
FIG. 1 is a block diagram depicting an exemplary embodiment of a video encoder configured for use according to the present invention.

FIG. 1 is a block diagram depicting an exemplary embodiment of a video encoder 100 configured for use according to the present invention. Since FIG. 1 is intended to only provide an illustrative example of a H.264 encoder, FIG. 1 should not be interpreted as limiting the present invention. For example, the video encoder 100 is compliant with the H.264 standard, the Moving Picture Experts Group (MPEG)-4, Part 10 standard, or the Advanced Video Coding (AVC) standard. The video encoder 100 may include a subtractor 102, a transform module, e.g., a discrete cosine transform (DCT) like module 104, a quantizer 106, an entropy coder 108, an inverse quantizer 110, an inverse transform module, e.g., an inverse DCT like module 112, a summer 114, a deblocking filter 116, a frame memory 118, a motion compensated predictor 120, an intra/inter switch 122, and a motion estimator 124. It should be noted that although the modules of the encoder 100 are illustrated as separate modules, the present invention is not so limited. In other words, various functions (e.g., transformation and quantization) performed by these modules can be combined into a single module.

In operation, the video encoder 100 receives an input sequence of source frames. The subtractor 102 receives a source frame from the input sequence and a predicted frame from the intra/inter switch 122. The subtractor 102 computes a difference between the source frame and the predicted frame, which is provided to the DCT module 104. In INTER mode, the predicted frame is generated by the motion compensated predictor 120. In INTRA mode, the predicted frame is zero and thus the output of the subtractor 102 is the source frame.

The DCT module 104 transforms the difference signal from the pixel domain to the frequency domain using a DCT algorithm to produce a set of coefficients. The quantizer 106 quantizes the DCT coefficients. The entropy coder 108 codes the quantized DCT coefficients to produce a coded frame.

The inverse quantizer 110 performs the inverse operation of the quantizer 106 to recover the DCT coefficients. The inverse DCT module 112 performs the inverse operation of the DCT module 104 to produce an estimated difference signal. The estimated difference signal is added to the predicted frame by the summer 114 to produce an estimated frame, which is coupled to the deblocking filter 116. The deblocking filter deblocks the estimated frame and stores the estimated frame or reference frame in the frame memory 118. The motion compensated predictor 120 and the motion estimator 124 are coupled to the frame memory 118 and are configured to obtain one or more previously estimated frames (previously coded frames).

The motion estimator 124 also receives the source frame. The motion estimator 124 performs a motion estimation algorithm using the source frame and a previous estimated frame (i.e., reference frame) to produce motion estimation data. For example, the motion estimation data includes motion vectors and minimum sums of absolute differences (SADs) for the macroblocks of the source frame. The motion estimation data is provided to the entropy coder 108 and the motion compensated predictor 120. The entropy coder 108 codes the motion estimation data to produce coded motion data. The motion compensated predictor 120 performs a motion compensation algorithm using a previous estimated frame and the motion estimation data to produce the predicted frame, which is coupled to the intra/inter switch 122. Motion estimation and motion compensation algorithms are well known in the art.

To illustrate, the motion estimator 124 may include mode decision logic 126. The mode decision logic 126 can be configured to select a mode for each macroblock in a predictive (INTER) frame. The "mode" of a macroblock is the partitioning scheme. That is, the mode decision logic 126 selects MODE for each macroblock in a predictive frame, which is defined by values for MB_TYPE and SUB_MB_TYPE.

The above description only provides a brief view of the various complex algorithms that must be executed to provide the encoded bitstreams generated by an H.264 encoder.

Embodiments of the invention estimate a motion vector for a macroblock of a source frame, where the motion vector predicts the position of the macroblock in an estimated frame. The motion vector is estimated by identifying a macroblock in the estimated frame that best matches the macroblock in the source frame and then calculating the displacement (i.e., the difference between the macroblock in the source frame and the macroblock in the estimated frame).

Figure 2:
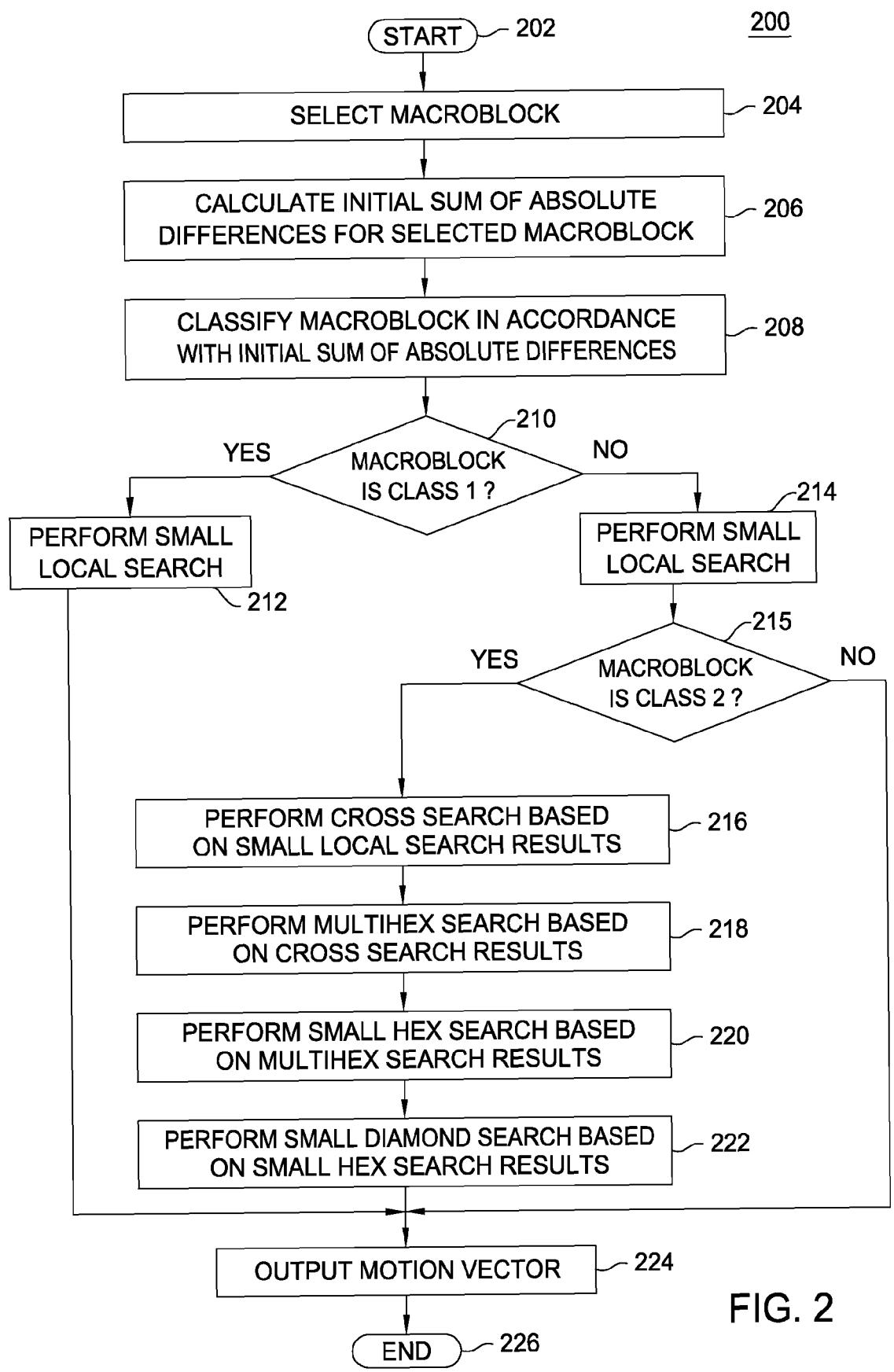
FIG. 2 is a flow diagram illustrating one embodiment of a method for estimating a motion vector for a macroblock of a source video frame, according to the present invention.

FIG. 2 is a flow diagram illustrating one embodiment of a method 200 for estimating a motion vector for a macroblock of a source frame, according to the present invention. The method 200 may be implemented, for example, by the video encoder 100 of FIG. 1, and more specifically by the motion estimator 124.

The method 200 is initialized at step 202, and proceeds to step 204, where the motion estimator selects or receives (e.g., from an input source frame) the source macroblock for which the motion vector is to be estimated. In step 206, the motion estimator calculates an initial matching cost for the source macroblock. In one embodiment, the initial matching cost is a SAD-based metric calculated by first computing the median of the motion vectors for two or more neighboring macroblocks of the source macroblock. A neighboring macroblock is a macroblock that resides one block in any direction (e.g., up, down, left, right, or diagonal) from the source macroblock. The median produces a preliminary or predicted motion vector for the source macroblock, where the predicted motion vector indicates an estimated macroblock in the estimated frame (e.g., retrieved from a frame memory), near which a macroblock best matching the source macroblock is expected to be found. The SAD between the estimated macroblock and the source macroblock is then computed to generate an initial matching cost for the source macroblock.

In step 208, the motion estimator classifies the source macroblock in accordance with its initial matching cost. In one embodiment, the source macroblock is classified into one of three potential classes: (1) a first class if the initial matching cost is less than a first predefined threshold; (2) a second class if the initial matching cost is greater than or equal to the first predefined threshold and if the absolute value of the difference between an intermediate matching cost and a final matching cost is greater than a second predefined threshold (e.g., zero); and (3) a third class if the initial matching cost is greater than or equal to the first predefined threshold and if the absolute value of the difference between an intermediate matching cost and a final matching cost is less than or equal to the second predefined threshold (e.g., zero). In one embodiment, the first predefined threshold varies with the cost metric. In a further embodiment, the first predefined threshold is a SAD-based threshold and is in the range of approximately one hundred to five hundred. The intermediate matching cost is the matching cost right after a small local search step, described in greater detail below with respect to steps 212 and 214; the final matching cost is the matching cost after execution of the method 200. Techniques for determining the intermediate matching cost and the final matching cost are discussed in greater detail below.

In step 210, the motion estimator determines whether the source macroblock is classified in the first class. If the motion estimator concludes in step 210 that the source macroblock is classified in the first class, then the motion estimator proceeds to step 212 and performs a small local search. In one embodiment, a small local search involves searching a fixed number of neighboring macroblocks to the estimated macroblock in the estimated frame that is identified by the predicted motion vector. In one embodiment, the neighboring macroblocks that are searched comprise the macroblocks residing one block to the left, to the right, up, and down from the estimated macroblock. The goal of the search is to locate the macroblock in the estimated frame that best matches the source macroblock.

After the small local search is performed and a best match to the source macroblock is identified, the method 200 proceeds to step 224, where the motion estimator outputs (e.g., to the entropy coder) an estimated motion vector representing the difference between the source macroblock in the source frame and the best matching macroblock in the estimated frame. The method 200 then terminates in step 226.

Referring back to step 210, if the motion estimator concludes that the source macroblock is not classified in the first class, the method 200 proceeds to step 214 and the motion estimator performs a small local search as described above with respect to step 212. After the motion estimator performs the small local search, the method 200 proceeds to step 215 and the motion estimator determines whether the source macroblock is classified in the second class. If the motion estimator concludes in step 215 that the source macroblock is not classified in the second class (i.e., the source macroblock is classified in the third class), the motion estimator advances to step 224 and proceeds as described above to output an estimated motion vector before the method 200 terminates in step 226.

Alternatively, if the motion estimator concludes in step 215 that the source macroblock is classified in the second class, the motion estimator proceeds to step 216, and performs a cross search using a best matching macroblock in the estimated frame as identified by the small local search as a center or starting point for the cross search. In one embodiment, the cross search involves searching pixels along the horizontal and vertical axes from the center, with a set distance (in one embodiment, two pixels) between search points along each axis, to locate a motion vector with a minimum matching cost.

In step 218, the motion estimator performs a multi-hex search based on the results of the cross search performed in step 216 (i.e., using the motion vector identified by the cross search as a center or starting point). In one embodiment, a multi-hex search involves searching pixels within concentric hexagons centered at the starting point, starting with a smallest hexagon and growing larger until a motion vector with a minimum matching cost is found.

In step 220, the motion estimator performs a small hex search based on the results of the multi-hex search performed in step 218 (i.e., using the motion vector identified by the multi-hex search as a center or starting point). In one embodiment, a small hex search involves searching pixels around the starting point until a minimum block distortion (MBD) point is the center of a newly formed hexagon.

In step 222, the motion estimator performs a small diamond search based on the results of the small hex search performed in step 220 (i.e., using the motion vector identified by the small hex search as a center or starting point). In one embodiment, a small diamond search involves searching pixels around the starting point until a minimum block distortion (MBD) point is the center of a newly formed diamond. After the small diamond search is performed and a best match to the source macroblock is identified, the motion estimator advances to step 224 and proceeds as described above to output an estimated motion vector before the method 200 terminates in step 226.

The motion estimator processes macroblocks classified in the third class in a manner similar to macroblocks classified in the first class (i.e., using only a small local search to estimate the motion vector). This is because the additional search steps described above (i.e., the cross search, multi-hex search, small hex search, and small diamond search) will not substantially change the estimated motion vector obtained from the small local search for macroblocks classified in the third class. On the other hand, the additional search steps are useful for processing macroblocks classified in the second class, because the additional search steps will, in this case, decrease the matching cost.

As discussed above, the second and third classes are differentiated by the values for the intermediate matching cost and the final matching cost. These values are used because macroblocks that should be classified in the second class and macroblocks that should be classified in the third class cannot be differentiated based solely on the initial matching cost, which is similar for the two classes. The intermediate matching cost can be determined from the small local search step 214 (e.g., by calculating the SAD).

As also discussed above, classification of a macroblock in the second class or the third class requires knowledge of the final matching cost. However, the final matching cost cannot be known before executing the method 200. Thus, a method is required for estimating the final matching cost.

One method for estimating the final matching cost is based on the assumption that if the predicted motion vector of the source frame is accurate, the final motion vector will be very close to the predicted motion vector. In such an instance, only a small local search would be necessary to identify the best matching macroblock (and the source macroblock may be classified in the third class). On the other hand, if the predicted motion vector is not accurate, then the location of the best matching macroblock in the estimated frame (and therefore the final motion vector) is unknown. In such an instance, a large search area is required in the estimated frame to estimate the final motion vector, and the source macroblock may be classified in the second class). These assumptions can be summarized as follows:

$$\text{Class} = \begin{cases} 2 & \text{if } |PMV - FMV| > t \\ 3 & \text{if } |PMV - FMV| \le t \end{cases} \quad \text{(EQN. 1)}$$

where PMV is the predicted motion vector of the source macroblock, FMV is the final motion vector of the source macroblock, and t is a second predefined threshold. In one embodiment, the second predefined threshold t represents the amplitude difference between two motion vectors (e.g., an absolute difference in amplitude between a predicted motion vector and a final motion vector).

Since the final motion vector for a macroblock, like the final matching cost, cannot be known before motion estimation is performed, the final motion vector for a correlated macroblock in a video frame immediately prior to the source frame is used. The correlated macroblock is the macroblock in the immediately prior frame that corresponds to the source macroblock in the source frame. Thus, EQN. 1 can be rewritten as:

$$\text{Class} = \begin{cases} 2 & \text{if } |PMV - FMV_{prior}| > t \\ 3 & \text{if } |PMV - FMV_{prior}| \le t \end{cases} \quad \text{(EQN. 2)}$$

where $FMV_{prior}$ is the motion vector of the correlated macroblock in the immediately prior frame.

Figure 3:
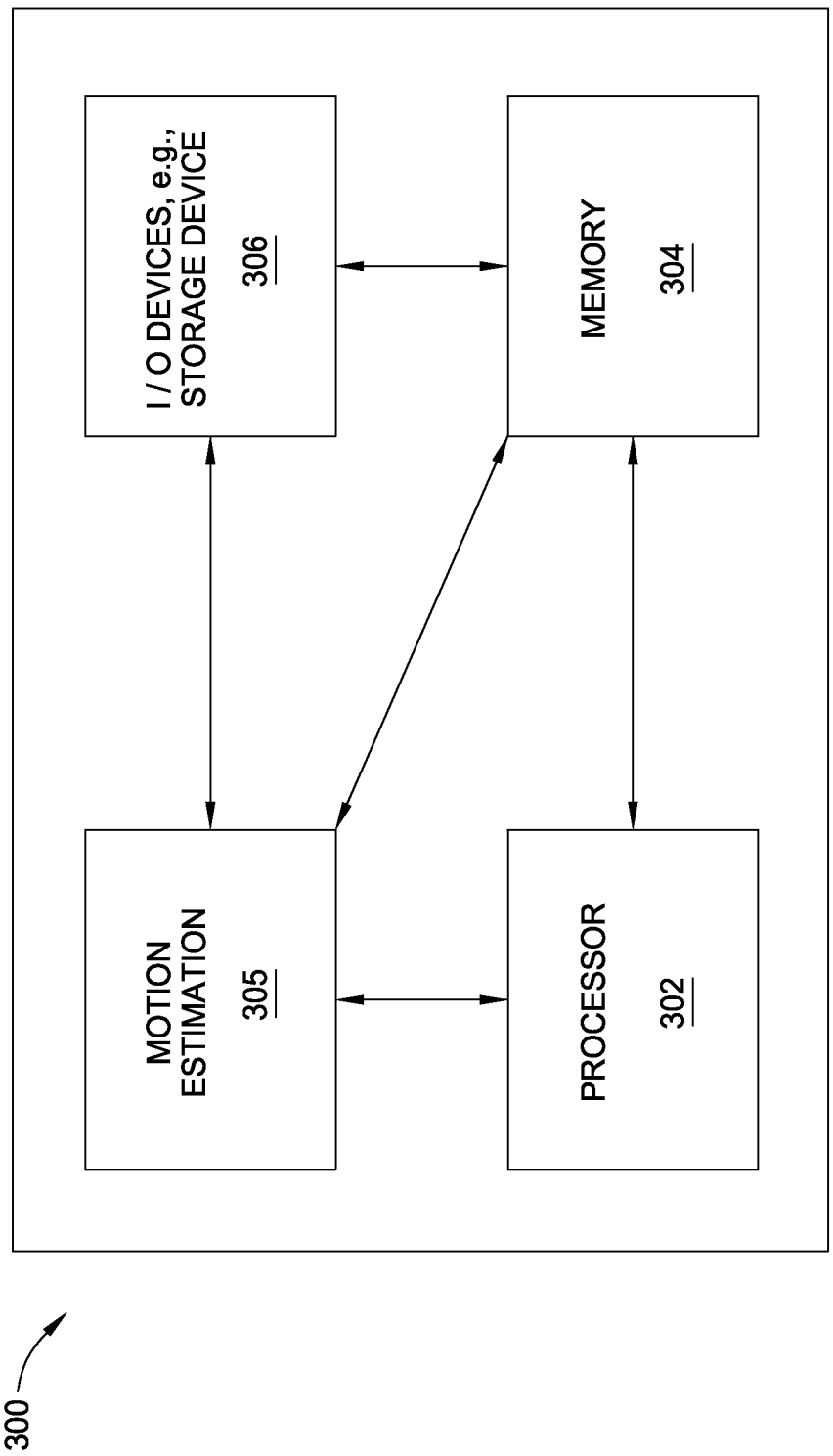
FIG. 3 is a high level block diagram of the present motion estimation method that is implemented using a general purpose computing device.

FIG. 3 is a high level block diagram of the present motion estimation method that is implemented using a general purpose computing device 300. In one embodiment, a general purpose computing device 300 comprises a processor 302, a memory 304, a motion estimation module 305 and various input/output (I/O) devices 306 such as a display, a keyboard, a mouse, a modem, a microphone, a speaker, a network connection and the like. In one embodiment, at least one I/O device is a storage device (e.g., a disk drive, flash memory, an optical disk drive, a floppy disk drive). It should be understood that the motion estimation module 305 can be implemented as a physical device or subsystem that is coupled to a processor through a communication channel.

Alternatively, the motion estimation module 305 can be represented by one or more software applications (or even a combination of software and hardware, e.g., using Application-Specific Integrated Circuits (ASIC)), where the software is loaded from a storage medium (e.g., I/O devices 306) and operated by the processor 302 in the memory 304 of the general purpose computing device 300. Additionally, the software may run in a distributed or partitioned fashion on two or more computing devices similar to the general purpose computing device 300. Thus, in one embodiment, the motion estimation module 305 for speeding up video encoder processes described herein with reference to the preceding figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Thus, the present invention represents a significant advancement in the field of video encoding. Embodiments of the invention employ an early termination technique based on classification to achieve faster video encoding speeds. Embodiments of the present invention can be employed in combination with a simplified hexagon search in order to achieve even faster speeds. However, the invention is not limited to combination with simplified hexagon search, and may in fact be easily extended to other motion estimation techniques as well.

While the foregoing is directed to embodiments of the invention, other and further embodiments of the invention may be devised without departing from the basic scope thereof.

What is claimed is:

1. A method for motion estimation, comprising:
classifying a macroblock of a source frame into classes in accordance with an initial matching cost, an intermediate matching cost, and a final matching cost, where the intermediate matching cost is estimated based on a predicted motion vector for the source frame and the final matching cost is estimated based on a final motion vector for a correlated macroblock in a prior frame;
performing motion estimation for the macroblock based upon the classifying, wherein an early termination is applied in accordance with a result of the classifying, wherein the classifying classifies the macroblock of the source frame into one of three potential classes; and
outputting a motion vector for the macroblock based on a result of the motion estimation.

2. The method of claim 1, wherein the three potential classes comprise:
a first class defined by macroblocks whose initial matching cost is less than a first predefined threshold;
a second class defined by macroblocks whose initial matching cost is greater than or equal to the first predefined threshold, and for whom an absolute value of a difference between the intermediate matching cost and the final matching cost is greater than a second predefined threshold; and
a third class defined by macroblocks whose initial matching cost is greater than or equal to the first predefined threshold, and for whom an absolute value of a difference between the intermediate matching cost and the final matching cost is less than or equal to a second predefined threshold.

3. The method of claim 2, wherein the performing applies the early termination if the macroblock of the source frame is classified in the first class or the third class.

4. The method of claim 3, wherein the early termination comprises ceasing the motion estimation after a small local search.

5. The method of claim 2, wherein the first predefined threshold is based on a sum of absolute differences.

6. The method of claim 2, further comprising:
computing the absolute value of the difference between the intermediate matching cost and the final matching cost;
classifying the macroblock of the source frame in the second class if the absolute value of the difference between the intermediate matching cost and the final matching cost is greater than the second predefined threshold; and
classifying the macroblock of the source frame in the third class if the absolute value of the difference between the intermediate matching cost and the final matching cost is less than or equal to the second predefined threshold.

7. The method of claim 6, wherein the second predefined threshold is based on a motion vector amplitude.

8. The method of claim 7, wherein the macroblock of the source frame is classified in accordance with:

$$\text{Class} = \begin{cases} 2 & \text{if } |PMV - FMV_{prior}| > t \\ 3 & \text{if } |PMV - FMV_{prior}| \leq t \end{cases}$$

where PMV is a predicted motion vector for the macroblock of the source frame and $FMV_{prior}$ is a motion vector of a macroblock in a frame immediately preceding the source frame that is correlated to the macroblock of the source frame, and t is the second predefined threshold.

9. The method of claim 1, wherein the predicted motion vector is predicted by:
identifying two or more neighboring macroblocks that neighbor the macroblock of the source frame in the source frame;
computing a median of motion vectors for the two or more neighboring macroblocks; and
setting the median as the predicted motion vector for the macroblock of the source frame.

10. The method of claim 1, wherein the initial matching cost is a metric based on a sum of absolute differences.

11. A non-transitory computer readable medium containing an executable program for motion estimation, where the program performs:
classifying a macroblock of a source frame into classes in accordance with an initial matching cost, an intermediate matching cost, and a final matching cost, where the intermediate matching cost is estimated based on a predicted motion vector for the source frame and the final matching cost is estimated based on a final motion vector for a correlated macroblock in a prior frame;
performing motion estimation for the macroblock based upon the classifying, wherein an early termination is applied in accordance with a result of the classifying, wherein the classifying classifies the macroblock of the source frame into one of three potential classes; and
outputting a motion vector for the macroblock based on a result of the motion estimation.

12. The non-transitory computer readable medium of claim 11, wherein the classifying comprises:
classifying the macroblock of the source frame in a first class if the initial matching cost is less than a first predefined threshold;
classifying the macroblock of the source frame in a second class if the initial matching cost is greater than or equal to the first predefined threshold, and if an absolute value of a difference between an intermediate matching cost and a final matching cost is greater than a second predefined threshold; and
classifying the macroblock of the source frame in a third class if the initial matching cost is greater than or equal to the first predefined threshold, and if an absolute value of a difference between an intermediate matching cost and a final matching cost is less than or equal to a second predefined threshold.

13. The non-transitory computer readable medium of claim 12, wherein the performing applies the early termination if the macroblock of the source frame is classified in the first class or the third class.

14. The non-transitory computer readable medium of claim 13, wherein the early termination comprises ceasing the motion estimation after a small local search.

15. The non-transitory computer readable medium of claim 12, wherein the first predefined threshold is based on a sum of absolute differences.

16. The non-transitory computer readable medium of claim 12, further comprising:
computing the absolute value of the difference between the intermediate matching cost and the final matching cost;
classifying the macroblock of the source frame in the second class if the absolute value of the difference between the intermediate matching cost and the final matching cost is greater than the second predefined threshold; and
classifying the macroblock of the source frame in the third class if the absolute value of the difference between the intermediate matching cost and the final matching cost is less than or equal to the second predefined threshold.

17. The non-transitory computer readable medium of claim 16, wherein the second predefined threshold is based on a motion vector amplitude.

18. The non-transitory computer readable medium of claim 17, wherein the macroblock of the source frame is classified in accordance with:

$$\text{Class} = \begin{cases} 2 & \text{if } |PMV - FMV_{prior}| > t \\ 3 & \text{if } |PMV - FMV_{prior}| \leq t \end{cases}$$

where PMV is a predicted motion vector for the macroblock of the source frame and $FMV_{prior}$ is a motion vector of a macroblock in a frame immediately preceding the source frame that is correlated to the macroblock of the source frame, and t is the second predefined threshold.

19. A video encoder, comprising:
an input for receiving a source frame; and
a motion estimator for classifying a macroblock of the source frame into classes in accordance with an initial matching cost, an intermediate matching cost, and a final matching cost, where the intermediate matching cost is estimated based on a predicted motion vector for the source frame and the final matching cost is estimated based on a final motion vector for a correlated macroblock in a prior frame, where the motion estimator further performs motion estimation for the macroblock based upon the classifying and applies an early termination in accordance with a result of the classifying, wherein the classifying classifies the macroblock of the source frame into one of three potential classes and where the motion estimator outputs a motion vector for the macroblock based on a result of the motion estimation.

20. The video encoder of claim 19, wherein the video encoder is compliant with at least one of: the H.264 standard, the Moving Picture Experts Group (MPEG)-4, Part 10 standard, or the Advanced Video Coding (AVC) standard.

21. The video encoder of claim 19, further comprising:
a frame memory for storing the prior frame.

22. The video encoder of claim 21, further comprising:
a motion compensated predictor coupled to the motion estimator and to the frame memory, for generating a predicted frame in accordance with the prior frame and the motion vector.

23. The video encoder of claim 22, further comprising:
a subtractor coupled to the input and to the motion compensated predictor for computing a difference between the predicted frame and the source frame;
a transform module coupled to the subtractor for transforming the difference into a set of coefficients;
a quantizer for quantizing the set of coefficients and for providing the set of coefficients, once quantized, to the entropy coder.

24. The video encoder of claim 19, further comprising:
an entropy coder coupled to the motion estimator for receiving the motion vector and for generating a coded frame from the source frame, in accordance with the motion vector.

* * * * *